US007862419B2

(12) United States Patent
Baerlocher et al.

(10) Patent No.: US 7,862,419 B2
(45) Date of Patent: Jan. 4, 2011

(54) GAMING DEVICE HAVING OUTCOMES WHICH REPLICATE THE LAWS OF PHYSICS

(75) Inventors: Anthony J. Baerlocher, Reno, NV (US); Anna Sheila C. Parrucho, Reno, NV (US); Cari L. Blomquist, Reno, NV (US)

(73) Assignee: IGT, Reno, NV (US)

( * ) Notice: Subject to any disclaimer, the term of this patent is extended or adjusted under 35 U.S.C. 154(b) by 427 days.

(21) Appl. No.: 11/668,350

(22) Filed: Jan. 29, 2007

(65) Prior Publication Data

US 2007/0155464 A1 Jul. 5, 2007

Related U.S. Application Data

(63) Continuation of application No. 10/738,426, filed on Dec. 16, 2003, now Pat. No. 7,169,044, which is a continuation of application No. 09/967,243, filed on Sep. 28, 2001, now Pat. No. 6,666,766.

(51) Int. Cl.
*A63F 13/00* (2006.01)

(52) U.S. Cl. ......................... 463/16; 463/20; 273/138.2

(58) Field of Classification Search .................. 463/16, 463/17, 18, 19, 20, 21, 22, 25, 26, 27; 273/138 A, 273/138.1, 138.2, 143 R
See application file for complete search history.

(56) References Cited

U.S. PATENT DOCUMENTS 4,448,419 A 5/1984 Telnaes
4,582,324 A 4/1986 Koza et al.
4,618,150 A 10/1986 Kimura
4,695,053 A 9/1987 Vazquez, Jr. et al.
4,871,171 A 10/1989 Rivero
5,016,879 A 5/1991 Parker et al.

(Continued)

FOREIGN PATENT DOCUMENTS

GB 2 341 262 3/2000
WO WO2005/094954 10/2005

OTHER PUBLICATIONS

"Plinko", as printed from http://en.wikipedia.org/wiki/Plinko on Apr. 10, 2009, 5 pages.*
Roulette Advertisement written by Atronic Casino Technology, published in 1999.
Jokers Wild Advertisement written by IGT, published prior to 2001.
Slot Line Publication including Pinball Description written by IGT, published in 1998.

(Continued)

*Primary Examiner*—James S McClellan
(74) *Attorney, Agent, or Firm*—K&L Gates LLP

(57) ABSTRACT

A processor controlled gaming device that randomly generates and displays a pachinko-type game and outcome on a screen connected to the processor. The gaming device initially provides a preliminary game that yields the number of attempts or objects that the player has in the pachinko-type game. Next, the game displays the pachinko-type game screen having a player selectable starting area. The starting area is large enough so that when the player picks a certain position of the area, the object falls from the selected position, hits a plurality of pegs and lands in an award position. The selected start position affects which award position that object eventually falls in accordance with the probability distribution predicted by the laws of physics. The player's award, however, is not affected by which start position the player selects.

36 Claims, 12 Drawing Sheets

U.S. PATENT DOCUMENTS

| | | | | |
|---|---|---|---|---|
| 5,131,655 | A | | 7/1992 | Ugawa |
| 5,342,047 | A | | 8/1994 | Heidel et al. |
| 5,393,061 | A | | 2/1995 | Manship et al. |
| 5,449,173 | A | | 9/1995 | Thomas et al. |
| 5,509,655 | A | | 4/1996 | Ugawa |
| 5,524,888 | A | | 6/1996 | Heidel |
| 5,639,089 | A | | 6/1997 | Matsumoto et al. |
| 5,695,188 | A | | 12/1997 | Ishibashi |
| 5,769,716 | A | | 6/1998 | Saffari et al. |
| 5,833,536 | A | | 11/1998 | Davids et al. |
| 5,833,537 | A | | 11/1998 | Barrie |
| 5,836,819 | A | | 11/1998 | Ugawa |
| 5,873,781 | A | | 2/1999 | Keane |
| 5,951,009 | A | | 9/1999 | Miyamoto et al. |
| 5,951,397 | A | | 9/1999 | Dickinson |
| 5,984,780 | A | * | 11/1999 | Takemoto et al. ............. 463/20 |
| 6,015,346 | A | | 1/2000 | Bennett |
| 6,047,963 | A | | 4/2000 | Pierce et al. |
| 6,071,192 | A | | 6/2000 | Weiss |
| 6,089,978 | A | | 7/2000 | Adams |
| 6,102,798 | A | | 8/2000 | Bennett |
| 6,139,013 | A | | 10/2000 | Pierce et al. |
| 6,142,874 | A | | 11/2000 | Kodachi et al. |
| 6,142,875 | A | | 11/2000 | Kodachi et al. |
| 6,159,095 | A | | 12/2000 | Frohm et al. |
| 6,159,097 | A | | 12/2000 | Gura |
| 6,165,070 | A | | 12/2000 | Nolte et al. |
| 6,174,235 | B1 | | 1/2001 | Walker et al. |
| 6,176,487 | B1 | | 1/2001 | Eklund et al. |
| 6,210,279 | B1 | | 4/2001 | Dickinson |
| 6,220,593 | B1 | | 4/2001 | Pierce et al. |
| 6,261,177 | B1 | | 7/2001 | Bennett |
| 6,267,669 | B1 | | 7/2001 | Luciano, Jr. et al. |
| 6,270,408 | B1 | | 8/2001 | Sakamoto et al. |
| 6,296,568 | B1 | | 10/2001 | Tracy |
| 6,315,664 | B1 | | 11/2001 | Baerlocher et al. |
| 6,340,158 | B2 | | 1/2002 | Pierce et al. |
| 6,386,976 | B1 | * | 5/2002 | Yamazaki et al. ............. 463/22 |
| 6,398,219 | B1 | | 6/2002 | Pierce et al. |
| 6,506,114 | B1 | | 1/2003 | Estes et al. |
| 6,769,982 | B1 | | 8/2004 | Brosnan |
| 7,284,756 | B2 | * | 10/2007 | Pierce et al. ............ 273/121 B |

OTHER PUBLICATIONS

PC-Plinko Ver. 10.0 written by UP Technologies, Inc., published in 1993.
Pachinko.txt written by Brian Kent, published 1997.
Plinko, written by Kenny Lyons, published Oct. 28, 2002.
Big Top Keno advertisement written by Aristocrat, published in 2000.
Pachinko.com (website) written by Real Entertainment Ltd. (printed Mar. 21, 2001).
Price is Right—Plinko Game Descriptions (website) (printed Mar. 21, 2001).
“Looney Darts” description printed from http: //www.lplizard.com/bally/darts.html Apr. 1999 (printed Jun. 2, 2006).
Pinball Advertisement written by IGT, available in 1998.
Party Time Razzle Dazzle Advertisement written by IGT, published in 1999.
Spring Carnival Article written by Strictly Slots, published in 2003 (printed Feb. 2, 2006).
Grochowski, J., “There’s No Dead Weight With This Anchor”. Casino City Times Article printed from http: //grochowski.casinocitytimes.com/articles/762..html, Dec. 1999 (printed Jun. 2, 2006).

* cited by examiner

FIG.7

190

142

| AWARD | PERCENT |
|---|---|
| 10 | 15% |
| 20 | 35% |
| 50 | 30% |
| 100 | 20% |

FIG.8

200

202 204 206 208 210 212

124

| START POSITION | AWARD POSITION | AWARD | NO. OF PATHS | PROBABILITY THAT POSITION IS SELECTED (%) | PROBABILITY PER PATH (%) |
|---|---|---|---|---|---|
| W | 128 | 10 | 4 | 12 | 3.0 |
| W | 130 | 50 | 6 | 22.5 | 3.75 |
| W | 132 | 20 | 6 | 21 | 3.5 |
| W | 134 | 100 | 5 | 20 | 4 |
| W | 136 | 20 | 4 | 14 | 3.5 |
| W | 138 | 50 | 2 | 7.5 | 3.75 |
| W | 140 | 10 | 1 | 3.0 | 3.0 |
| X | 128 | 10 | 3 | 11.25 | 3.75 |
| X | 130 | 50 | 4 | 15.0 | 3.75 |
| X | 132 | 20 | 5 | 17.5 | 3.5 |
| X | 134 | 100 | 6 | 20.0 | 3.33 |
| X | 136 | 20 | 5 | 17.5 | 3.5 |
| X | 138 | 50 | 4 | 15.00 | 3.75 |
| X | 140 | 10 | 1 | 3.75 | 3.75 |
| Y | 128 | 10 | 1 | 3.75 | 3.75 |
| Y | 130 | 50 | 4 | 15.00 | 3.75 |
| Y | 132 | 20 | 5 | 17.5 | 3.5 |
| Y | 134 | 100 | 6 | 20.0 | 3.33 |
| Y | 136 | 20 | 5 | 17.5 | 3.5 |
| Y | 138 | 50 | 4 | 15.0 | 3.75 |
| Y | 140 | 10 | 3 | 11.25 | 3.75 |
| Z | 128 | 10 | 1 | 3.0 | 3.0 |
| Z | 130 | 50 | 2 | 7.5 | 3.75 |
| Z | 132 | 20 | 4 | 14 | 3.5 |
| Z | 134 | 100 | 5 | 20 | 4 |
| Z | 136 | 20 | 6 | 21 | 3.5 |
| Z | 138 | 50 | 6 | 22.5 | 3.75 |
| Z | 140 | 10 | 4 | 12 | 3.0 |

142

FIG.11

250

| START POSITION (202) | AWARD POSITION (204) | PROBABILITY THAT POSITION IS SELECTED (%) (210) |
|---|---|---|
| 124 L | 139 | 18 |
| L | 141 | 30 |
| L | 143 | 40 |
| L | 145 | 10 |
| L | 147 | 2 |
| 124 M | 139 | 14 |
| M | 141 | 25 |
| M | 143 | 40 |
| M | 145 | 15 |
| M | 147 | 6 |
| 124 N | 139 | 10 |
| N | 141 | 20 |
| N | 143 | 40 |
| N | 145 | 20 |
| N | 147 | 10 |
| 124 O | 139 | 6 |
| O | 141 | 15 |
| O | 143 | 40 |
| O | 145 | 25 |
| O | 147 | 14 |
| 124 P | 139 | 2 |
| P | 141 | 10 |
| P | 143 | 40 |
| P | 145 | 30 |
| P | 147 | 18 |

GAMING DEVICE HAVING OUTCOMES WHICH REPLICATE THE LAWS OF PHYSICS

PRIORITY CLAIM

This application is a continuation of, and claims the benefit of and priority to U.S. patent application Ser. No. 10/738,426, filed on Dec. 16, 2003, entitled "GAMING DEVICE HAVING OUTCOMES WHICH REPLICATE THE LAWS OF PHYSICS," which is a continuation of, and claims the benefit of and priority to U.S. patent application Ser. No. 09/967,243, filed on Sep. 8, 2001, entitled, "GAMING DEVICE HAVING OUTCOMES WHICH REPLICATE THE LAWS OF PHYSICS", now U.S. Pat. No. 6,666,766, and which are incorporated herein in their entirety.

CROSS REFERENCE TO RELATED APPLICATIONS

The present invention relates to the following commonly owned U.S. patent applications: "Gaming Device Having Game Scheme Allowing Player Skill To Affect Symbol Movement Without Affecting Award," Ser. No. 09/684,535; now U.S. Pat. No. 6,572,473; "Wagering Gaming Device Having Simulated Control of Movement of Game Functional Elements," Ser. No. 10/243,899; and "Wagering Game Device Providing Physical Simulation Responses to Various Components of the Gaming Device," Ser. No. 10/244,125; "Gaming Device Having Game Scheme Allowing Player Skill To Affect Symbol Movement Without Affecting Award, Ser. No. 10/408,606, now U.S. Pat. No. 6,918,830.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having outcomes which replicate the laws of physics.

BACKGROUND OF THE INVENTION

Gaming devices provide enjoyment and excitement to players, in part, because they may ultimately lead to monetary awards for the players. Gaming devices also provide enjoyment and excitement to the players because they are fun to play. Bonus games, in particular, provide gaming device manufacturers with the opportunity to add enjoyment and excitement to that which is already expected from a base game of the gaming device. Bonus games provide extra awards to the player and enable the player to play a game that is different than the base game.

A continuing need exists to provide gaming devices that issue awards in exciting and enjoyable manners. In this respect, it is desirable to enable the player to have an impact on, or a hand in, determining their award. It is also desirable to enable a player to optimize an award. It is further desirable to increase this level of player interaction. Each of these features is desirable in a base or primary game and in a bonus or secondary game.

One popular game, common to gaming establishments, is pachinko. Pachinko is extremely popular in Japan and can be found in certain casinos in the United States. Originally, pachinko machines consisted of mechanical pegs or nails extending from a board or background, which were spaced apart in a predefined manner. The game used small steel balls of approximately ½ inch diameter. More recently, following the trend in the gaming industry, computerized pachinko games now exist with realistic sounds and graphics as well as additional sounds and graphics to make the game more exciting.

In mechanical or video form, pachinko involves the same principles. The player inserts money into a game and receives a number of balls or tries in a loading area. In older systems, the player typically pulls a spring-loaded pinball like handle or knob and shoots a single pachinko ball into an upright or angled play area where the ball bounces from one mechanical or simulated peg or nail to another, through the network of pegs or nails.

In newer systems, the player sets a motor speed so that the ball speed falls somewhere between barely entering the play area to rocketing into the play area. In either type of mechanical system, the pachinko ball either falls unsuccessfully to the bottom of the play area or into a winning pocket, whereby the player wins a prize. In pachinko games, most of the balls fall unsuccessfully through the playing area.

In the mechanical version, the player controls the speed at which the ball leaves the spring-loaded handle. Otherwise the laws of physics control the outcome. Pachinko games are simple, interactive and considered by many people to be fun and exciting to watch or play. Accordingly, pachinko makes for an entertaining primary or bonus game in a gaming device.

In creating a realistic pachinko type game, a need exists to provide the player the ability to control the starting point for the ball, chip or object to enter the play area. A need also exists to provide a pachinko type game that follows or appears to follow or replicate the laws of physics, so that the starting point of the object affects the ending point of the object. That is, there exists a need to provide a pachinko-type gaming machine in which it appears that the player has control over the game's outcome. Finally, it is desirable that these features be coupled to a game having predictable payouts so that the game designer can accurately predict a payout percentage and employ a random number generator to generate the predictable payouts.

SUMMARY OF THE INVENTION

The present invention provides a gaming device having a game that may be implemented in a primary or bonus game. More specifically, the present invention provides a processor controlled gaming device that randomly generates and displays a pachinko-type game and outcome on a screen connected to or controlled by the processor. The gaming device initially provides a preliminary game that yields the number of attempts or objects that the player has in the pachinko-type game. Next, the game displays the pachinko-type game screen having a player selectable starting area. The starting area is large enough so that when the player picks a certain position of the area, the object appears to fall from the selected position, hits a plurality of pegs and lands in an award position. The selected start position affects which award position that the object eventually falls into in accordance with a probability distribution predicted by the laws of physics. The player's award, however, is not effected by which start position the player selects.

The game displays the starting area to the player but preferably does not display the start positions that the area encompasses. This way, the player must learn that selecting different parts of the area affects the initial falling point for the object. The screen preferably operates in conjunction with a touch screen that maps the coordinates of the start positions on the display device. When the player unknowingly or otherwise selects a particular start position, the touch screen sends a discrete input of the coordinates selected by the player's touch on the display device to the processor. The processor then directs the object to fall from the selected start position or a position adjacent to the selected coordinates. In an alternative embodiment, the game provides or displays separate start positions instead of a single starting area.

After the game provides the number of attempts via the preliminary game, the player may start the pachinko-type game. When the player selects the starting area, one of the objects falls, hits a first peg and changes direction; falls, hits a second peg and changes direction, etc. Eventually, the object falls into an award position having a corresponding award, and the game issues the award to the player. The player and game repeat this process for each object or attempt given to the player. The pegs have coordinates on the display device and when any portion of the object touches or intersects a coordinate set of a peg, the object changes direction on the display device.

The objects move according to paths maintained in the memory device of the gaming device. The paths map out, for any given start position and award position, which and how many pegs that the object hits when traveling from position to position. The game includes a plurality of different paths for each start position, which adds variety and excitement to the game. The more likely outcomes, i.e., the ones that will more likely occur according to the laws of physics, will occur more frequently and are associated to more paths.

The game also stores a set of data in the memory device, which sets the overall probability of generating any one of the different awards. If two or more award positions provide the same award value, the overall probability is divided between the two or more award values. For a given start position, the probability division is made based on the relative number of paths associated with each award position and the start position. That is, if there are twice as many paths from the start position to a first award position than there are to a second award position, the first award position is more likely to be generated. Both probabilities, though, add to the overall probability set in memory. This way, the game appears to be in accordance with the laws of physics and also provides a predictable payout percentage.

It is therefore an advantage of the present invention that the gaming device provides a pachinko-type game.

It is another advantage of the present invention that the gaming device provides a pachinko-type game in which the player has the ability to control the starting point for the object to enter the play area.

It is also an advantage of the present invention that the gaming device provides a pachinko-type game that follows or appears to follow the laws of physics, so that the starting point affects the ending point.

It is a further advantage of the present invention that the gaming device provides a pachinko-type game in which it appears that the player has some control over the game's outcome.

It is yet another advantage of the present invention that the gaming device provides a pachinko-type game having predictable payouts so that the game designer can accurately predict a payout percentage.

It is still another advantage of the present invention that the gaming device provides a pachinko-type game with multiple starting positions, wherein each has the same expected value.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 7 is a graphical representation of a table, database or compilation of award and probability data stored in the memory device of the gaming device, wherein each different award of the present invention is provided a likelihood of being randomly generated.

FIG. 8 is a graphical representation of a table, database or compilation of start positions, award positions, path numbers and probability data stored in the memory device of the gaming device, wherein each start position-award position combination has an associated number of paths and probability of being randomly generated.

FIG. 11 is a graphical representation of a table, database or compilation of start positions, award positions and probability data stored in the memory device of the gaming device for the bowling game embodiment.

DETAILED DESCRIPTION OF THE INVENTION

Gaming Device and Electronics

Figure 1A:
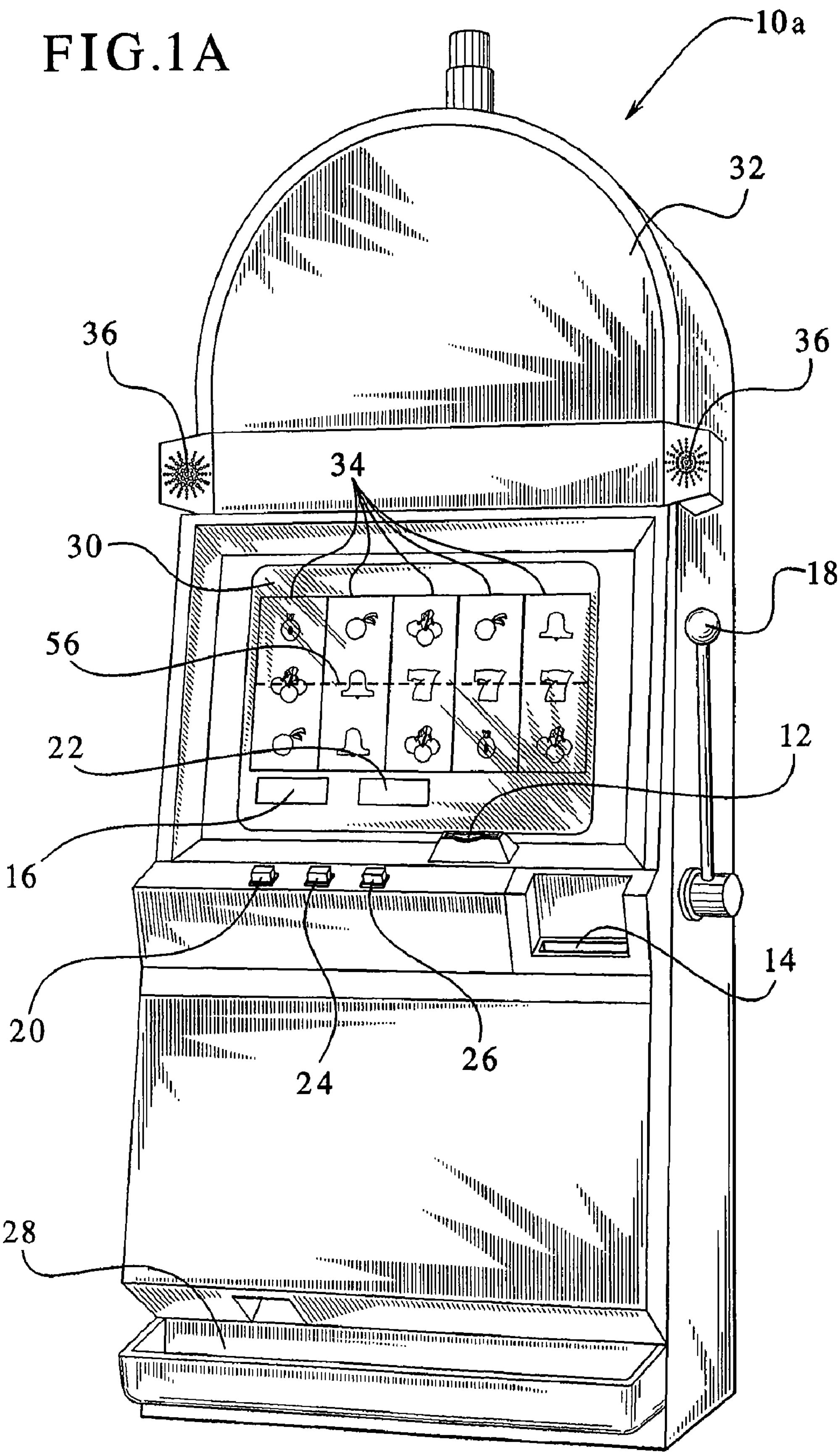
FIGS. 1A and 1B are perspective views of alternative embodiments of the gaming device of the present invention.
Figure 1B:
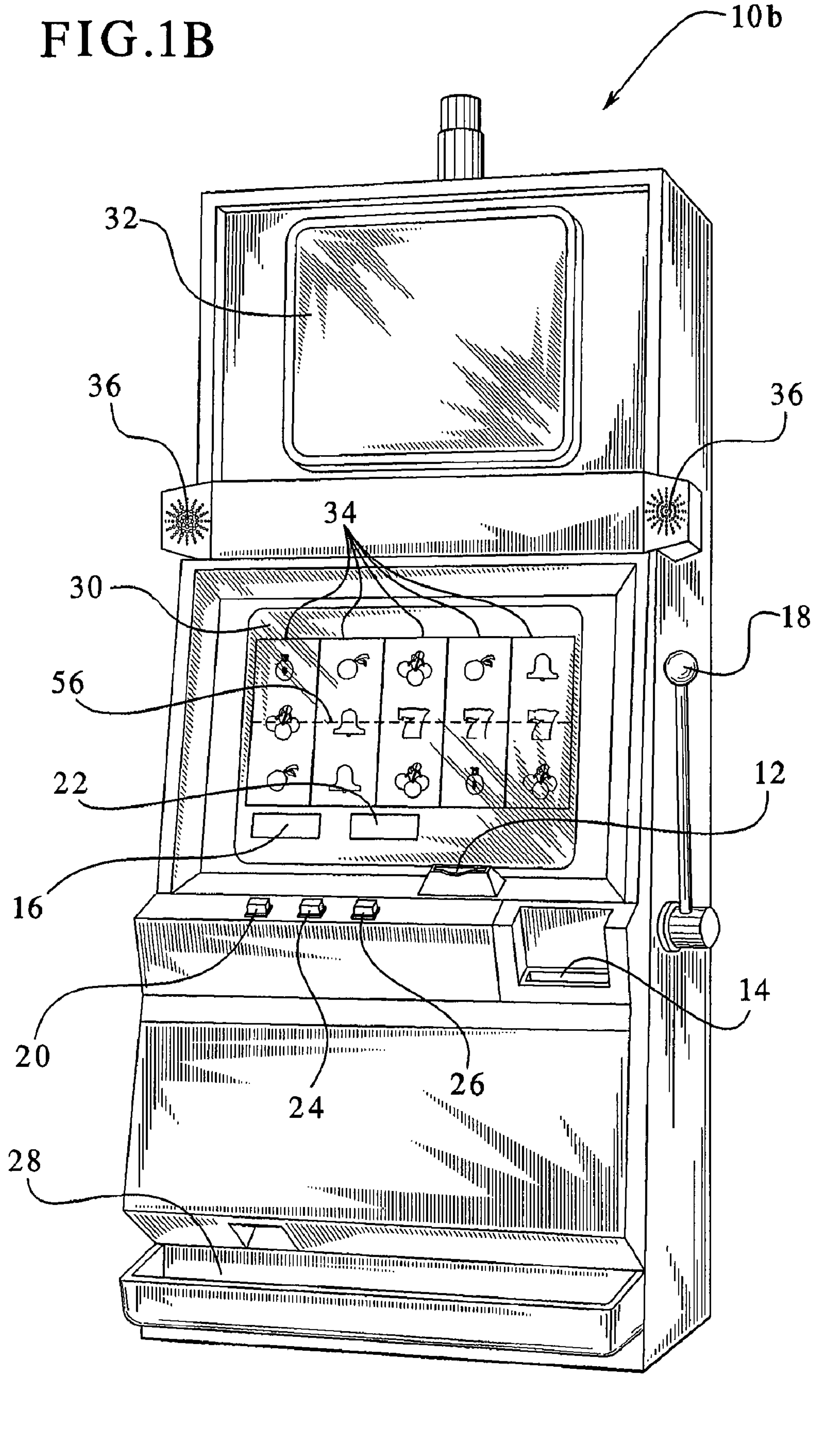

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
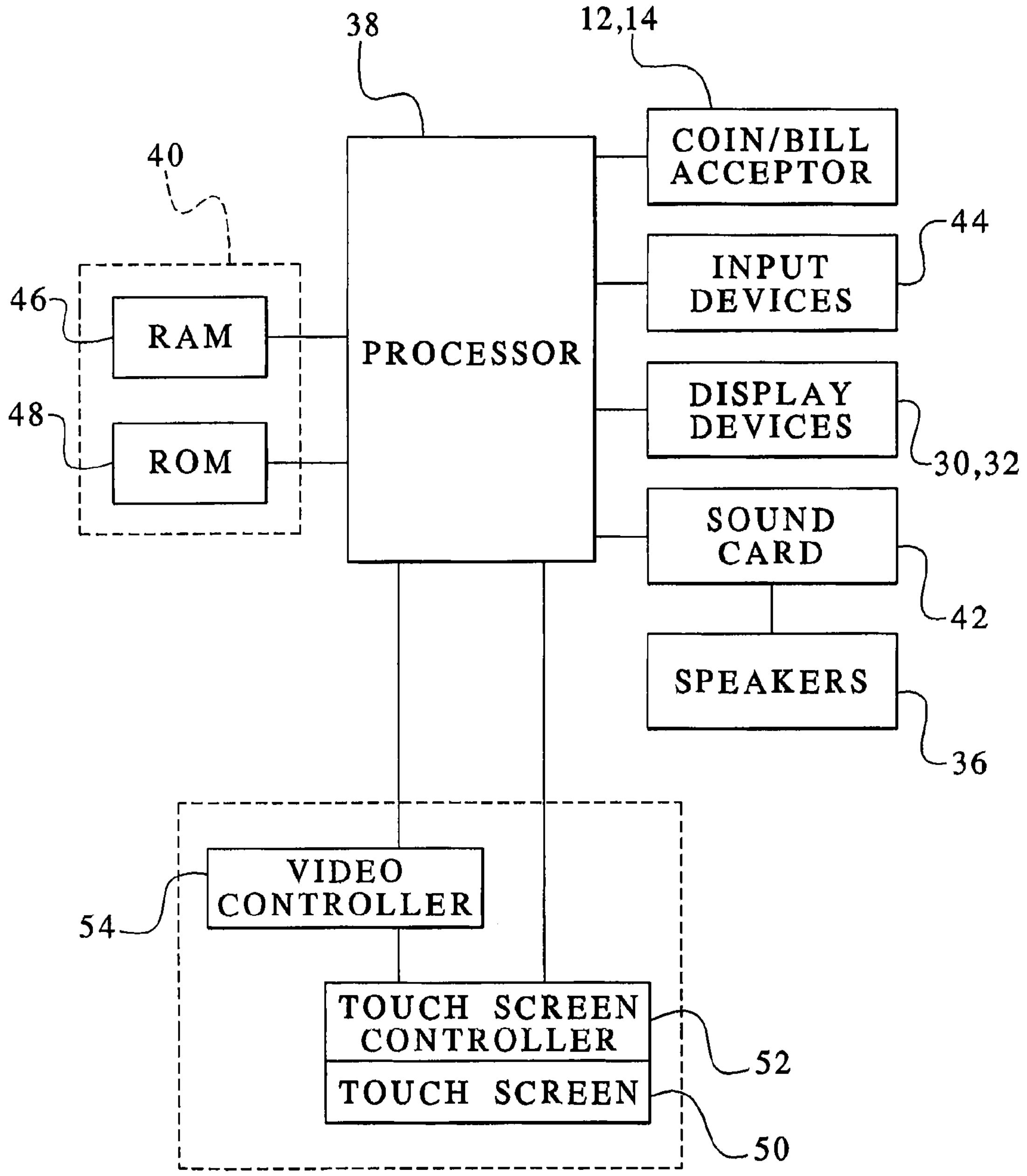
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on, e.g., three adjacent reels 34 along a payline 56. It should be appreciated that the present invention includes one or more paylines, such as payline 56, wherein the paylines can be horizontal, diagonal or any combination thereof. An alternative scatter pay qualifying condition includes the number seven appearing on, e.g., three adjacent reels 34 but not necessarily along a payline 56, appearing on any different set of reels 34 three times or appearing anywhere on the display device the necessary number of times.

Preliminary Game

In the pachinko-type game of the present invention discussed below, the game provides the player with a number of attempts or objects with which to play the present invention. In one embodiment, the game randomly or in a predefined manner provides the player with a number of attempts or objects. In another embodiment, the game displays and enables the player to play a preliminary game that determines the number of attempts or objects that the player has in the preferred game display. It should be appreciated that the game could also simply provide the player with a predetermined number of objects, a number of objects based on the player's wager, or a randomly determined number of objects.

The preliminary game may be adapted in many different ways. In each adaptation, the preliminary game has an outcome of a number of attempts or objects. Certain adaptations include other outcomes such as credit awards, credit multipliers, free games, etc. In embodiments where the pachinko-type game is a primary or base game, the preliminary game may result in providing zero attempts or objects to the player. In embodiments where the pachinko-type game is a secondary or bonus game, the preliminary game preferably results in providing at least one attempt or object to the player. This is because bonus games preferably result in some award for the player.

Figure 3A:
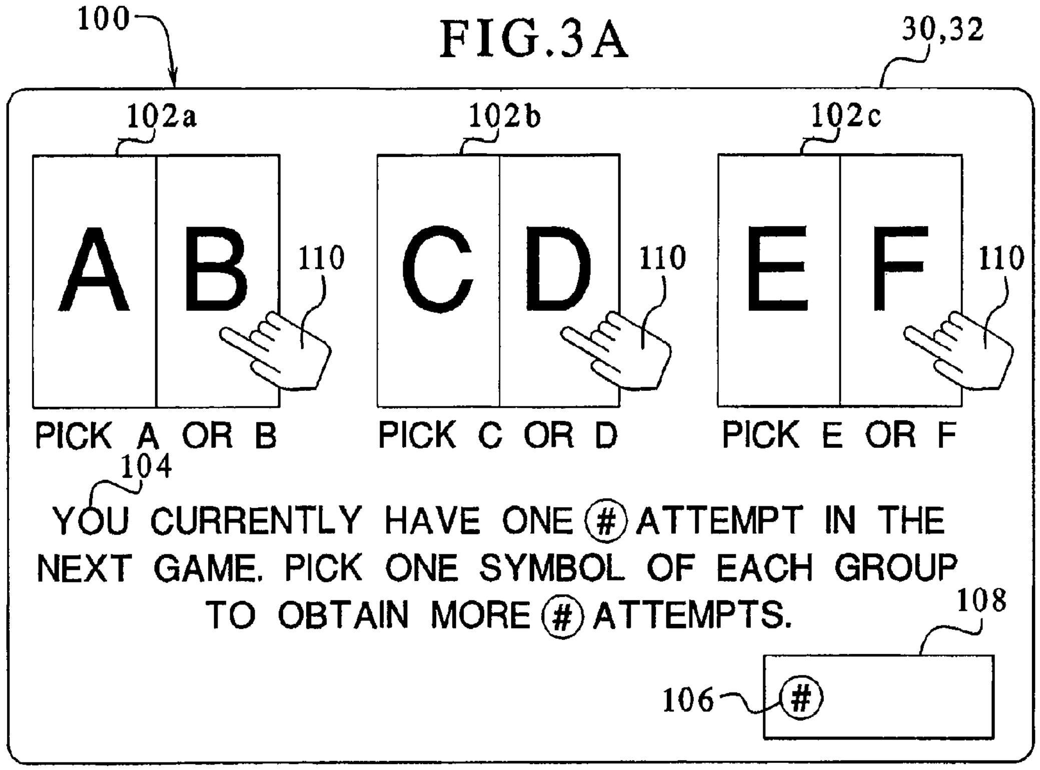
FIGS. 3A and 3B are front elevational views of one of the display devices that illustrate one embodiment of a preliminary game of the present invention.

One preferred preliminary game embodiment is disclosed in FIG. 3A. The game provides a number of opportunities to the player to accumulate attempts or objects for the pachinko-type game. One of the display devices 30 or 32 displays a screen 100 having three opportunities for the player to collect attempts or objects. The three opportunities are illustrated here as selection groups 102*a*, 102*b* and 102*c*. The preliminary game may be adapted to provide any random or predefined number of such opportunities or selection groups.

The gaming device 10 displays a suitable audio, visual or audiovisual message 104 instructing that the player is initially and automatically given one attempt or object 106 (preliminary game illustrated as a bonus rather than a primary game), which is also indicated in an object meter 108. The message 104 also informs the player to pick one symbol from each group 102*a*, 102*b* and 102*c* to obtain more attempts or objects 106. Each of the groups also has a message, such as "Pick A or B for group 102*a*."

In the screen 100, the gaming device 10 provides the player a fifty percent chance at obtaining another object 106 with each opportunity or group. That is, one of the symbols of each group masks an object 106 and the other masks nothing or a consolation award. The groups 102*a*, 102*b* and 102*c* may have the same or different likelihoods of yielding an additional object 106. The groups 102*a*, 102*b* and 102*c* may individually or collectively have any probability desired by the implementor. The preliminary game in one implementation requires the player to pick from the groups in a predefined order, e.g., the "A/B" group, the "C/D" group and the "E/F" group. In such a case the probabilities may vary as the player progresses. In another implementation, the player is free to pick from the groups 102*a*, 102*b* and 102*c* in any order.

Figure 3B:
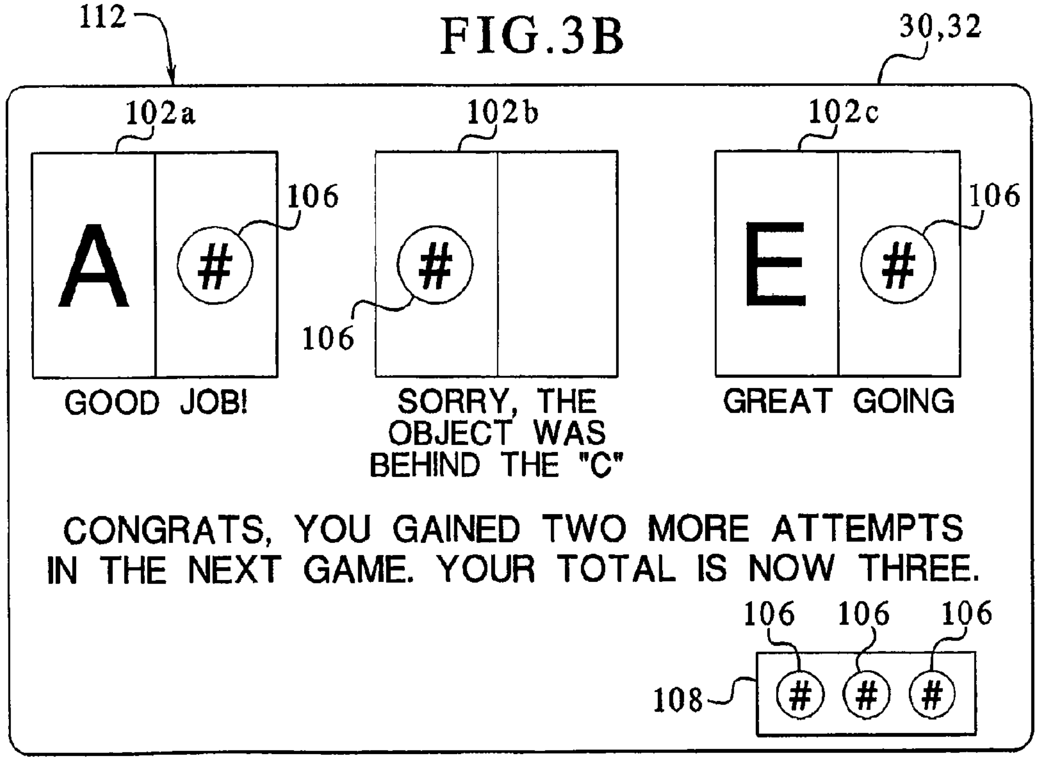

In the screen 100 of FIG. 3A, a player 110 picks the "B" symbol, the "D" symbol and the "F" symbol to be revealed from the respective groups 102*a*, 102*b* and 102*c*. The screen 112 of FIG. 3B illustrates that two of the player's picks, namely the "B" and the "F" resulted in extra attempts or objects. The game preferably reveals which symbol has hidden the object 106 (e.g., symbol "C") if the player picks the wrong symbol (more applicable when the player has more than two symbols to chose from). The object meter 108 updates according to the player's success at picking objects 106 and now shows three attempts or objects 106. The game may be adapted to provide any suitable message(s), as illustrated, informing the player of the results.

The player either enters the pachinko-type game with the three attempts or objects 106, or the gaming device 10 provides another preliminary game screen, such as the screen 100 of FIG. 3A, and the above described process occurs again. The preliminary game may be adapted to have any number of stages or levels, wherein gaming device 10 adds attempts or objects 106 to the object meter 108. As indicated above, any suitable type of determination or preliminary game may be employed to determine the number of objects obtained by the player.

If the present invention is embodied in a base or primary game, i.e., a non-bonus game, gaming device 10 in one embodiment provides an opportunity for the player to purchase objects 106 with credits. For example, the base game embodiment may be adapted to provide one object 106 per credit up to a maximum spending limit. Upon playing an object 106, the player would then win nothing or less than a credit if the player loses, win a credit if the player breaks even or more than a credit if the player wins. The gaming device 10 in one implementation provides an extra object or objects for spending the maximum amount of credits. For example, if one credit buys one object and the player can spend up to five credits, the base or primary game may be adapted to provide six objects 106 instead of five when the player wagers the maximum five credits.

Pachinko-Type Game

Figure 4:
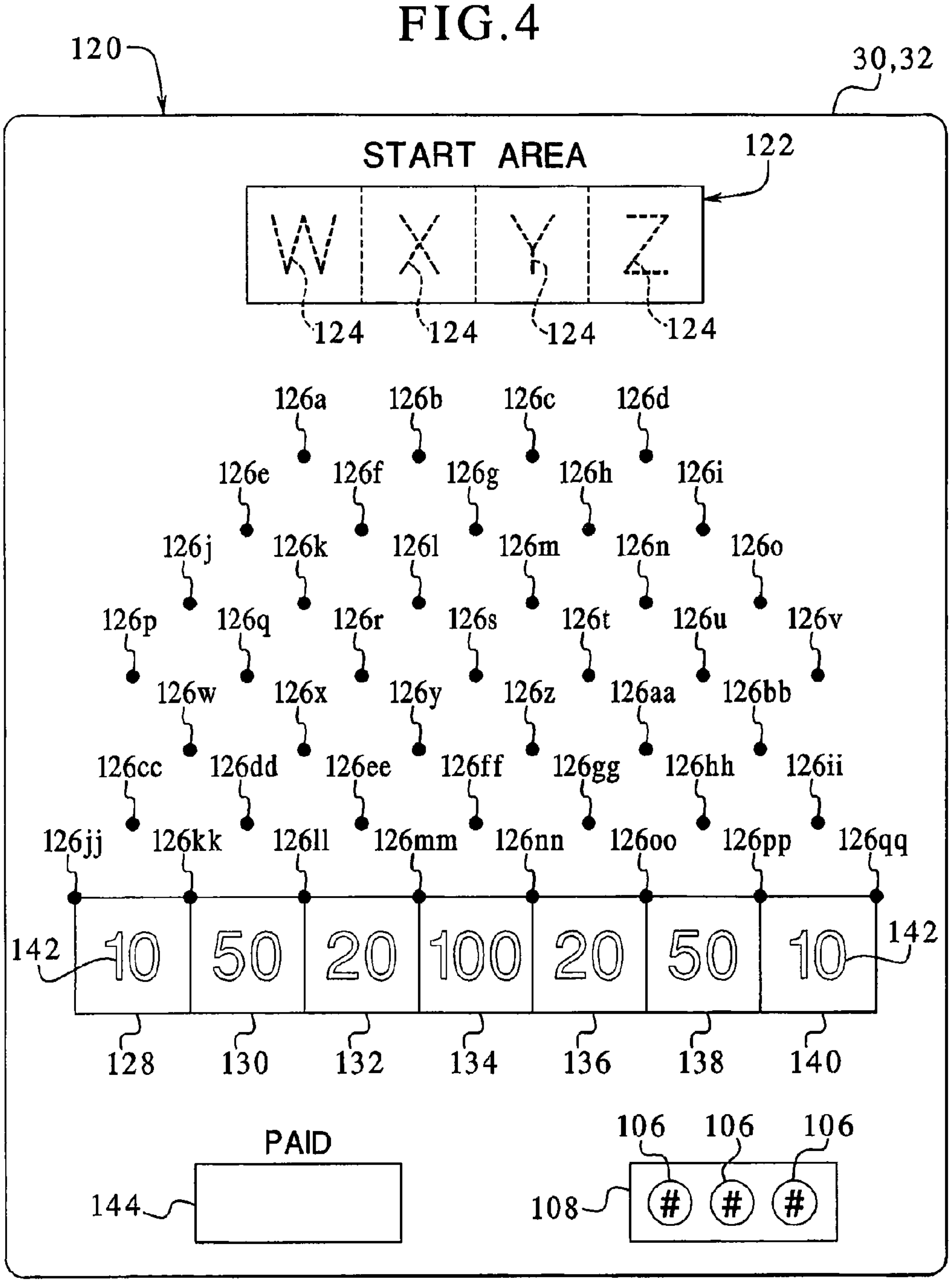
FIG. 4 is a front elevational view of one of the display devices that illustrates one embodiment of a pachinko-type game screen of the present invention, wherein the start positions are hidden from the player.

Referring now to FIG. 4, one of the display devices 30 or 32 displays a screen 120 having one embodiment of a pachinko-type game of the present invention. The game includes a start area 122 having a plurality of start positions 124, which in one preferred embodiment are hidden from the player and are therefore illustrated in phantom. That is, the start positions 124 "W" through "Z" have coordinates on the display device 30 or 32 within the start area 122, but the player does not see the start positions 124 "W" through "Z" which are used by the processor as discussed below. The player does however preferably see the elongated start area 122. The game may be adapted to include any desired number of start positions 124 and preferably more than one. The screen 120 includes four start positions 124. Another preferred embodiment includes six start positions 124.

The display device 30 or 32 operates in connection with the touch screen 50 and touch screen controller 52 (FIG. 2), so that the start positions 124, within the start area 122, are preferably separate areas of the touch screen 50 adapted to send discrete inputs to the processor 38 upon a player's selection. That is, the display device 30 or 32 displays one start area 122 to the player, to whom it appears that there is a single input. The start area 122, however, includes a number of start positions 124, each invoking different outcome tables as illustrated below. If the player touches the left end of the start area 122, the game produces an outcome associated with the "W"

start position. If the player touches the right end of the start area 122, the game produces an outcome associated with the "Z" start position. If the player touches a middle part of the start area 122, the game produces an outcome associated with the "X" or "Y" start positions respectively.

When an object 106 falls from one of the start positions 124, it falls as if pulled by gravity, until it hits a peg 126*a* through 126*qq*. Each peg 126*a* through 126*qq*, which the gaming device 10 displays to the player, has sets of coordinates on the display device 30 or 32. When a moving object 106 hits, i.e., any part of the object 106 touches or intersects any of the coordinates making up the set of a peg, the object 106 changes direction and may or may not change speed. The pegs 126*a* through 126*qq*, appearing as immovable objects, appear to impart a force on the moving object 106 and, according to the laws of physics, since the pegs do not move, the objects 106 must change direction, speed or both.

The game may be adapted to further follow the laws of physics, so that the more direct the collision between the moving object 106 and the peg, the more the game affects the object 106 in terms of a directional or a speed change. The game includes a suitable audio sound from the speakers 36, which coincides with the object 106 impacting a peg 126*a* through 126*qq*, and which may be adapted to indicate a direct hit versus a glancing or swiping hit. Eventually, the object ends up in one of the award positions 128 through 140. Each of the award positions 128 through 140 is associated with and displays a value 142. The illustrated values 142 include two tens, two twenties, two fifties and a one hundred. The distribution of the values 142 is discussed in more detail below.

One of the display devices 30 or 32 displays the object 106 moving or falling, hitting various pegs or blockages and eventually winding up in one of the award positions 128 through 140. The motion of the object 106 may be displayed in a plurality of ways. In one embodiment, the game randomly generates a path beginning from one of the start positions, including a plurality of pegs and including a final award position. A dynamic visual clip such as a dynamic animation, video clip, motion picture or combination thereof is stored and recalled based on the randomly generated path. In another embodiment, a plurality of dynamic visual clips are stored for each path, wherein gaming device 10 randomly generates one of the clips based on the generated path. In a further embodiment, gaming device 10 generates the path in real time, wherein the processor 38 cooperates with the memory device 40 to move the object 106 from a start position to a peg, from one peg to another peg and from a peg to an award position as these moves are generated. Obviously, gaming device 10 may be programmed to generate the serially linked outcomes in a plurality of different ways. For example, each peg may be associated with a plurality of other pegs or award positions, wherein one of the associated pegs or positions is randomly generated and wherein a visual display for the combination is shown on the display device 30 or 32.

The screen 120 also includes a paid display 144. The paid display indicates the player's award when the player wins at the pachinko-type game of the present invention. The screen 120 and the other screens illustrated herein may include other indicators, such as a simulated credit display 16 (FIGS. 1A and 1B), a bet lines display, a bet per line display and a total bet display, as well as others. The screen 120 and the other screens may also contain indicia and symbols relating to a theme of the present invention.

The values 142 may be adapted to represent any type of gaming device 10 value, such as a number of game credits, a game credit multiplier, a number of selections from a prize pool or a number of free games. If the award is a credit multiplier, the value 142 is preferably multiplied by a number of game credits displayed elsewhere on the gaming device 10, such as the player's total bet, total credits indicated by the credit display 16 (FIGS. 1A and 1B), bet per one or more active slot paylines or win along one or more slot paylines.

The display 120 thus displays a pachinko-type game. The player in one embodiment does not shoot a pachinko ball into one of the start positions 124, as in most real pachinko games, although the screen 120 could be suitably modified to do so as described below. The screen 120 also displays the object meter 108 and the number of objects 106 obtained in the preliminary game as described in connection with FIGS. 3A and 3B. The object meter 108 informs the player of how many initial attempts the player has and how many remaining attempts the player has as the game progresses. The attempts are indicated by the number of objects 106 or balls.

Figure 5A:
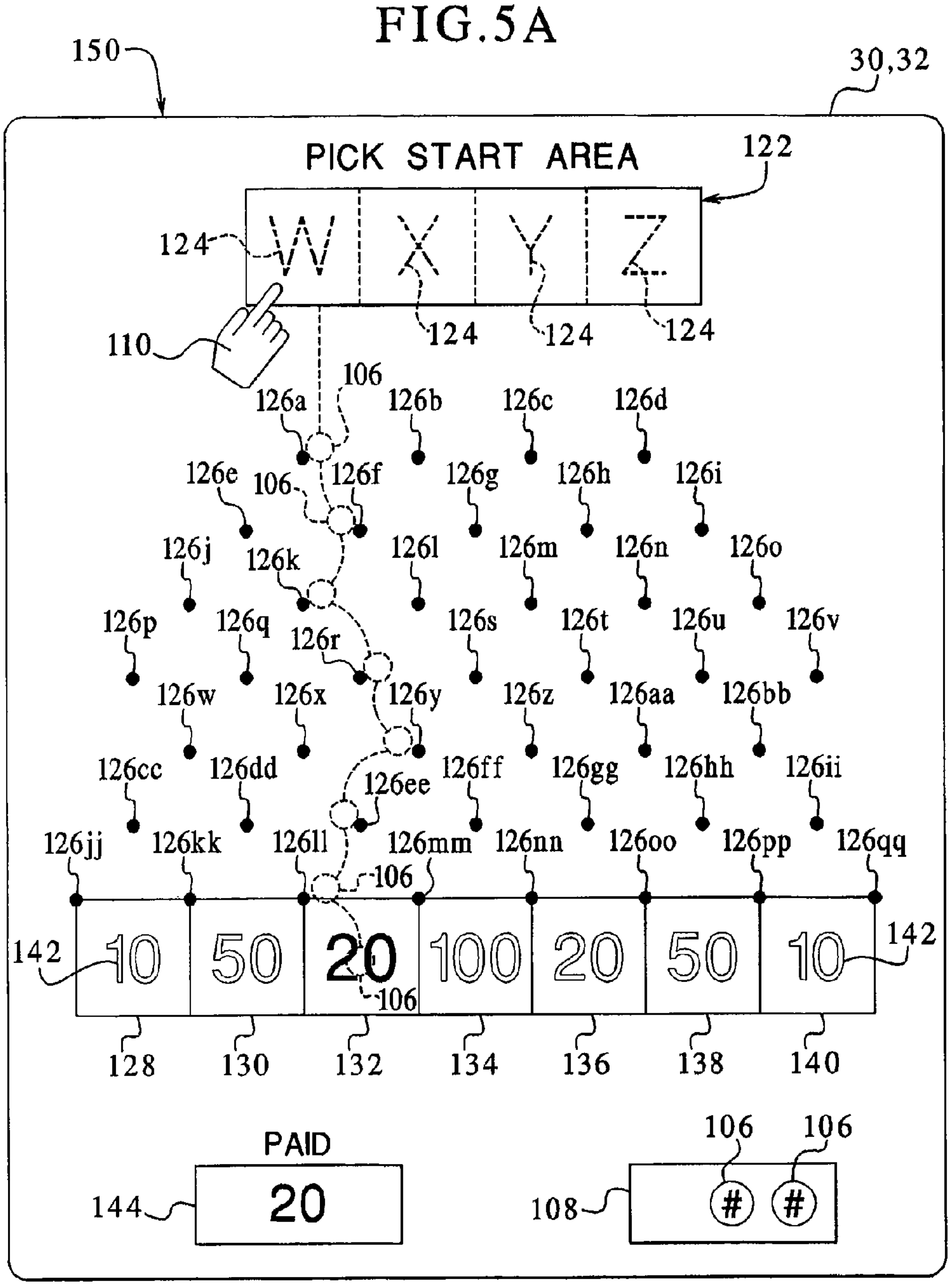
FIGS. 5A though 5C are front elevational views of one of the display devices that illustrates a pachinko-type game of the present invention.
Figure 5B:
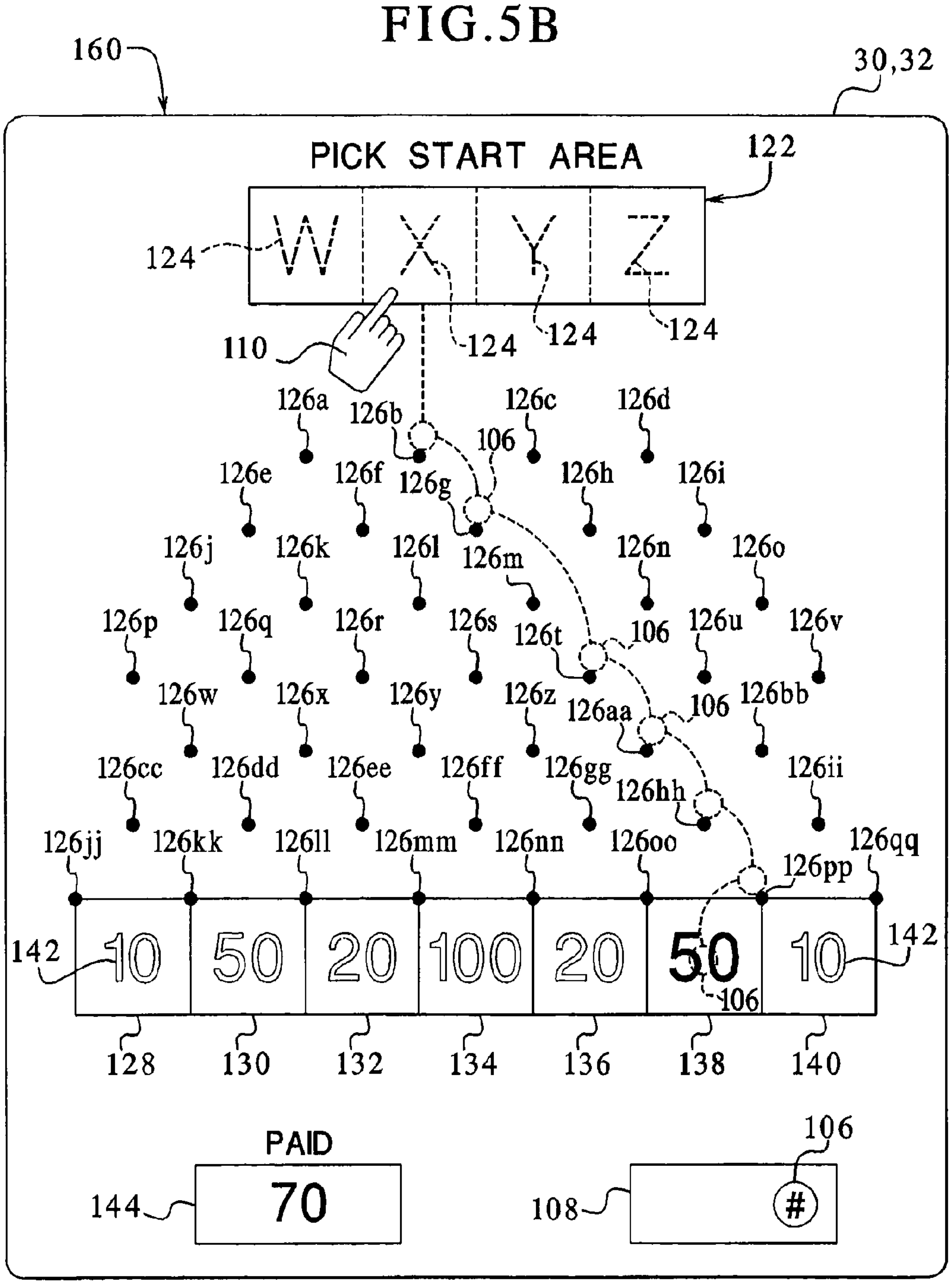
Figure 5C:
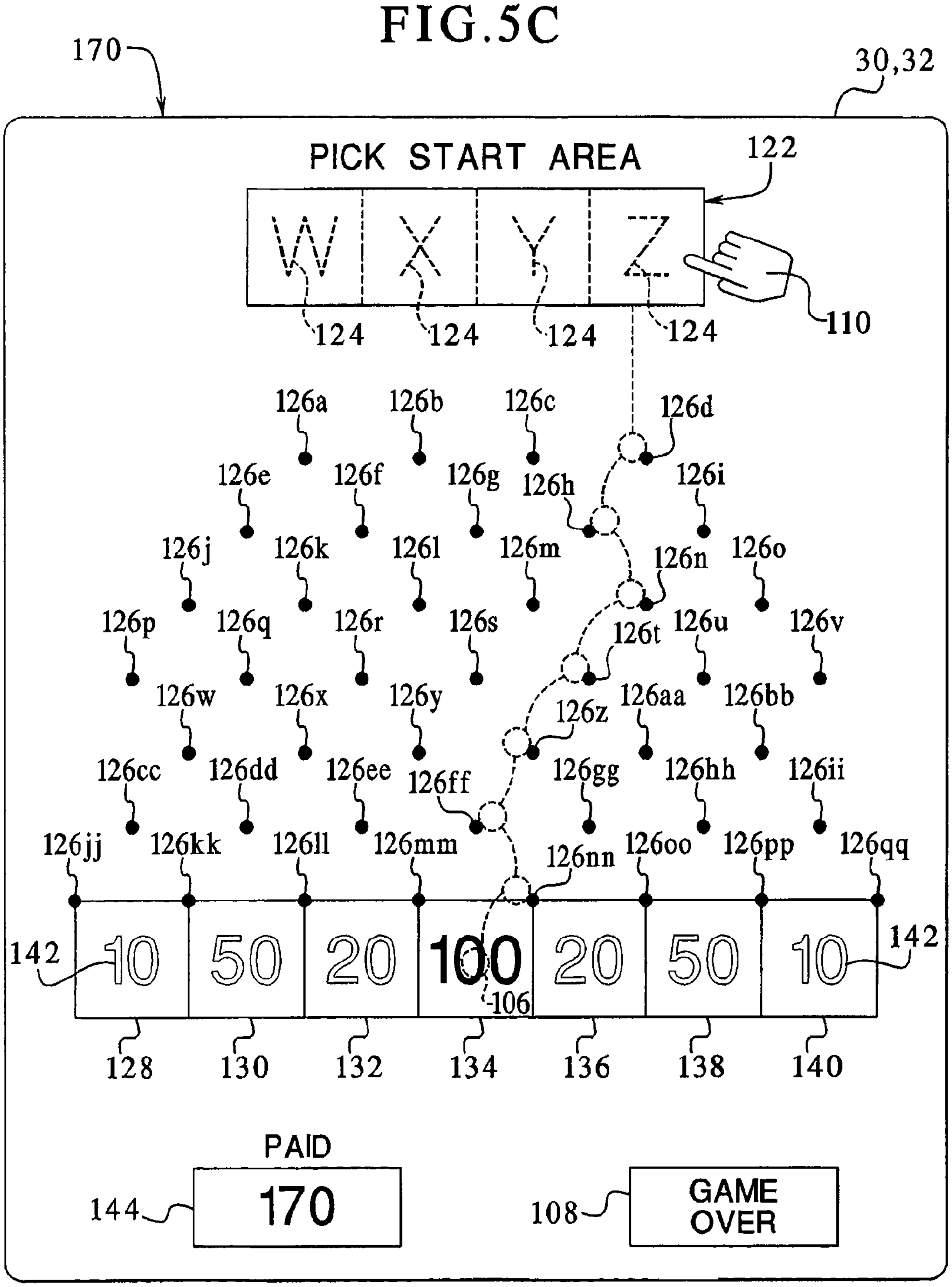

Referring now to FIGS. 5A through 5C, an example of a preferred embodiment of the present invention is illustrated. In the screen 150 of FIG. 5A, the player 110, unaware of the existence of the different start positions 124, presses the start area 122 on its left end, i.e., in an area having coordinates of the display device 30 or 32 corresponding to the "W" start position 124. Unbeknownst to the player, the touch screen 50 sends a discrete signal for the "W" start position 124 to the processor 38.

The processor 38 directs that the sequence begins from the selected "W" start position 124, wherein: a first object 106 falls from the "W" position 124 and hits the peg 126*a*; changes direction and hits the peg 126*f*; changes direction and hits the peg 126*k*; changes direction and hits the peg 126*r*; changes direction and hits the peg 126*y*; changes direction and hits the peg 126*ee*; changes direction and hit peg 126*ll*; and finally falls into the award position 132 having the twenty value 142. The game provides the player twenty awards as updated by the paid display 144 and subtracts one object 106 from the object meter 108. Here, the object 106 falls a relatively small horizontal distance from the "W" position 124 to the award position 132, which is more likely than falling into the award positions 128, 134, and 136, as predicted by the laws of physics.

In this example, the object 106 has fallen into a high probability award position 132, which is described in more detail below. That is, the laws of physics predict that the object 106 of a given mass and having a certain initial velocity hits the above mentioned pegs and lands in the award position 132 a relatively high percentage of the time. According to the laws of physics, the balls should fall to a position closer to the start position more often than to a position further away from the start position. In the preferred pachinko-type game of the present invention, because the award position 132 is nearly directly under the "W" start position 124, objects 106 falling from the "W" position land in the award position 132 a relatively high percentage of the time.

In the screen 160 of FIG. 5B, the player 110, unaware of the existence of the different start positions 124, presses the start area 122 in its left-middle portion, i.e., in an area having coordinates of the display device 30 or 32 corresponding to the "X" start position 124. Unbeknownst to the player, the touch screen 50 sends a discrete signal for the "X" start position 124 to the processor 38.

The processor 38 directs that the sequence begins from the selected "X" start position 124, wherein: a second object 106 falls from the "X" position 124 and hits the peg 126*b*; changes direction and hits the peg 126*g*; changes direction, skips a row of pegs and hits the peg 126*t*; changes direction and hits the peg 126*aa*; changes direction and hits the peg 126*hh*; changes direction and hits the peg 126*pp*; and finally falls into the award position 138 having the fifty value 142. The game provides the player fifty awards as updated by the paid display 144 and subtracts one object 106 from the object meter 108. Here, the object 106 falls a relatively large horizontal distance from the "X" position 124 to the award position 138, which is possible but less likely than falling into the award positions 128 through 136, as predicted by the laws of physics.

The memory device 40 and the sound card 42 may be adapted, as is well known in the art, to store different sounds, wherein the processor 38 selects one of the sounds when the object 106 hits or impacts a peg. The sounds are selected to coincide with the laws of physics. For example, gaming device 10 may be adapted to provide the same sound when the object hits the pegs 126*m*, 126*aa*, 126*hh* and 126*pp* because the object 106 falls approximately the same distance before hitting these pegs. Gaming device 10 may be adapted to provide a different sound, e.g., louder or of a higher impact nature when the object 106 skips a row of pegs, falls farther, and hits the peg 126*t*. A different sound may also be played when the object 106 falls from the "X" start position 124 directly onto the peg 126*b*. Gaming device 10 may also invoke a sound of the object 106 rattling to a stop in a bin or cup when the object falls into the award position 138.

In the screen 170 of FIG. 5C, the player 110 is now down to the last attempt or object 106 and is still unaware of the existence of the different start positions 124. The player presses the start area 122 on its right-most portion, i.e., in an area having coordinates of the display device 30 or 32 corresponding to the "Z" start position 124. Unbeknownst to the player, the touch screen 50 sends a discrete signal for the "Z" start position 124 to the processor 38.

The processor 38 in FIG. 5C directs that the sequence begins from the selected "Z" start position 124, wherein: the third and last object 106 falls from the "Z" position 124 and hits the peg 126*d*; changes direction and hits the peg 126*h*; changes direction and hits the peg 126*n*; changes direction and hits the peg 126*t*; changes direction and hits the peg 126*z*; changes direction and hits the peg 126*ff*; changes direction and hits the peg 126*nn*; and finally falls into the award position 134 having the one hundred value 142. The game provides the player one hundred awards as updated by the paid display 144 and subtracts the final object 106 from the object meter 108, whereby the game ends. Here, the object 106 falls an intermediate horizontal distance from the "Z" start position 124 to the award position 134, which is possible but less likely than falling into the award positions 136 and 138, as predicted by the laws of physics.

In the screen 160 of FIG. 5B, the object 106 falls a relatively large horizontal distance away from the "X" position 124, into the low probability award position 138. The laws of physics would predict that the object 106 would fall from the "X" position 124 to the award position 138 relatively infrequently. In the game, therefore, the object 106 is less likely to follow this path. Similarly, in the screen 170 of FIG. 5C, the object 106 falls an intermediate horizontal distance away from the "Z" position 124, into the intermediate probability award position 134. In the game, therefore, the object 106 has an intermediate chance of following this path.

It should be appreciated from the screens 150, 160 and 170 that the player has control over the start position 124 even though the game preferably does not expressly inform the player of this feature. The player, after playing the pachinko-type game of the present invention a number of times, likely discovers this feature. The feature is important for a couple of reasons. First, to make the game more exciting and to simulate pachinko, it is desirable to have different starting positions. That is, the game is less exciting if the object 106 always falls from the same spot of the start area 122. Given this, the game can appear rigged if the player chooses a spot on the left side of the start area 122, and the object 106 falls from the middle or right side of the start area 122.

In real pachinko, the player can control the starting position of the playing area, and providing such interactive control to the player increases excitement and enjoyment. To this end, in one embodiment the display device 30 or 32 or a separate electromechanical pushbutton provides an input device or a control device. Gaming device 10 prompts the player to select or interact with the control device. The control device enables the player to control a physical characteristic that affects the movement of the object 106. In one embodiment, the control device enables the player to control the initial speed of the object 106. The display device 30 or 32 in one implementation provides a plurality of selections, such as a slow selection, medium selection and a fast selection, wherein the player chooses the object's initial speed.

The player's physical characteristic selection may be adapted to have a plurality of outcomes. First, the selection can affect the path that the object 106 takes on the display device 30 or 32 to travel to one of the start positions (e.g., pick of slow speed yields a limp path and pick of fast speed yields a path having a plurality of ricochets, etc. Second the selection can affect a randomly generated start position 124 (e.g., slow speed more likely to generate nearer start position 124 on the display device 30 or 32, while fast speed yields a more remote start position 124). Third, the selection can affect the path from the player selected start position 124 to the game generated award position (e.g., slow speed yields straighter path, while fast speed yields more dynamic path to the game award positions).

Figure 6:
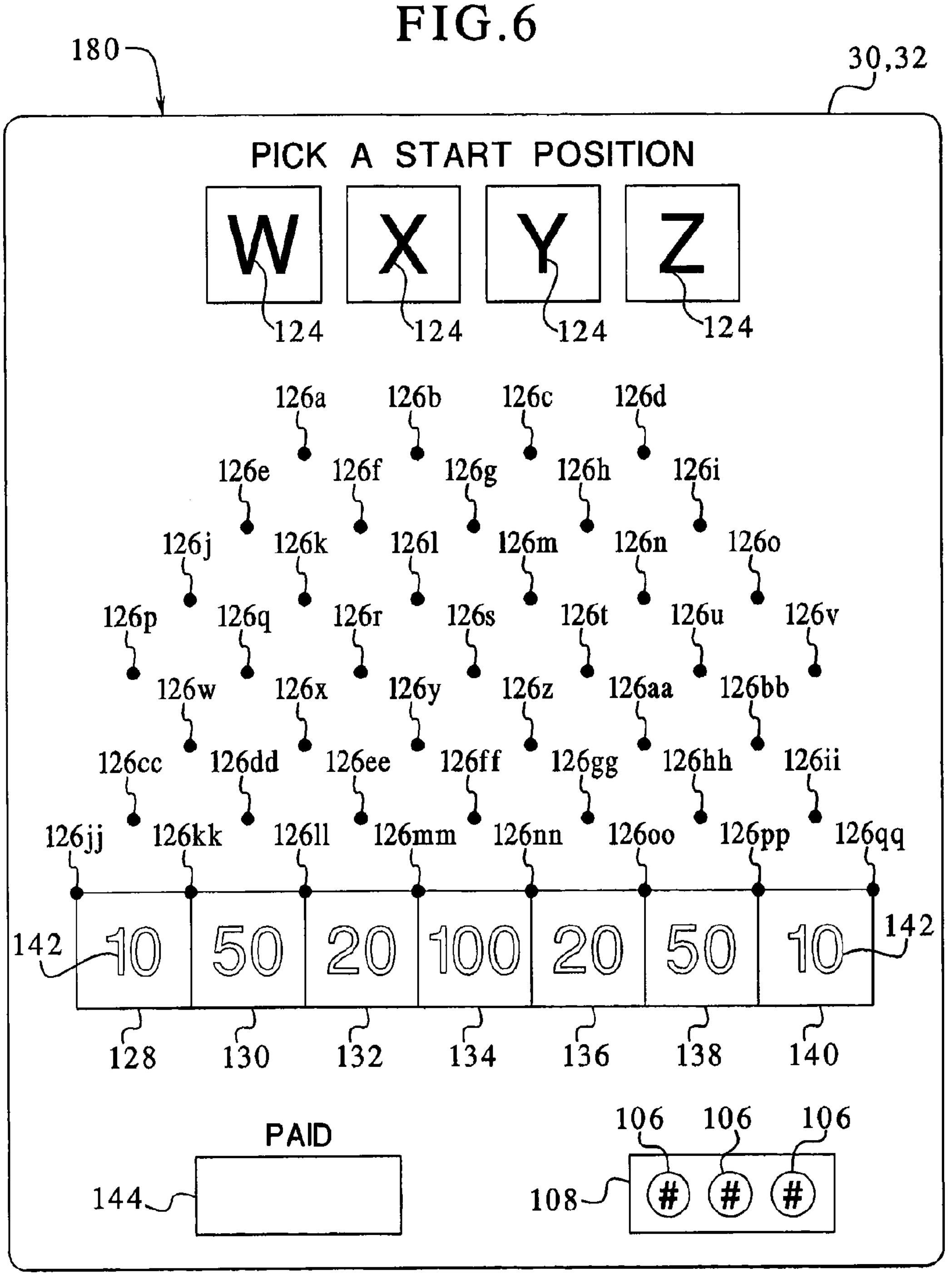
FIG. 6 is a front elevational view of one of the display devices that illustrates one alternative embodiment of a pachinko-type game screen of the present invention, wherein the start positions are displayed to the player.

In an alternative embodiment illustrated by the screen 180 of FIG. 6, the game displays the individual start positions 124 "X" through "Z," and therefore does not display the encompassing start area 122. In this embodiment, the player also has control over the starting position 124. Each starting position 124 sends a discrete input to the processor 38 when the player selects the position 124. Unlike before, the game of this embodiment displays the start positions 124 and thereby expressly informs the player where to press if the player desires a particular starting position 124.

In a further alternative embodiment, the award positions 128 through 140 are instead end-positions. The end-positions visually operate with the start positions 124, the pegs and the falling object 106 in the same manner as herein described. The end-positions, however, are not necessarily associated with an award 142. The end-positions may be individually adapted to provide or not provide an award. Alternatively, gaming device 10 may operate to provide an award or not provide an award based on a combination of end-positions generated after the player 110 selects a start position 124 to set the object 106 in motion a number of times.

Database Structure

Referring now to FIG. 7, a graphical representation of a probability distribution stored in the memory device 40 (FIG. 2) is illustrated. The table 190 contains the different values 142 that are illustrated in FIGS. 4, 5A though 5C and 6. The table 190 also contains the likelihood or percentage that a random generation device, usually stored in software, picks any of the particular awards. As illustrated, the game randomly generates the ten value 142 fifteen percent of the time, the twenty value 142 thirty-five percent of the time, the fifty value 142 thirty percent of the time and the one hundred value 142 twenty percent of the time.

The game may be adapted to have any number of values 142, any value distribution in the award positions 128 through 140 and any probability distribution amongst the different values. Setting the probability distribution for generating values 142 in the table 190 guarantees a certain average payout for the pachinko-type game of the present invention and enables the implementor to employ the game in a stand alone environment or combine the game with one or more bonus games and/or a base game.

One way to implement the weighted probability distribution is for the processor 38 to direct a random generation device stored in the memory device 40 to randomly generate a number 0 to 99. The memory device 40 also stores: that the numbers 0 through 14 yield the ten value 142; that the numbers 15 through 49 yield the twenty value 142; that the numbers 50 through 79 yield the fifty value 142 and that the numbers 80 through 99 yield the one hundred value 142. When the generation device generates a number 0 to 99, the corresponding value 142 is added to the player's total credits or to a temporary credit accumulation, such as that illustrated in the paid display 144 (FIGS. 4, 5A to 5C and 6), which is at some point added to the player's total credits indicated in the credit display 16 (FIGS. 1A and 1B).

Referring now to FIG. 8, a schematic representation of a preferred data table 200 of the present invention is illustrated. The data of table 200 is stored in the memory device 40 of the gaming device 10. The table 200 contains a start position column 202 that lists each of the start positions 124 seven times, one for each award position 128 to 140 of the award position column 204. For each possible start position/award position combination, the table 200 associates: (i) the corresponding value 142 that the game issues for obtaining the combination in the award column 206; (ii) a number of possible paths that the object 106 can take in the path column 208; (iii) a probability that the game selects the award position (assuming player picks the start position 124) in the column 210; and (iv) a probability that the game selects any one of the possible paths in the column 212.

The number of paths shown in the column 208 designates the number of different combinations of pegs 126*a* through 126*qq* that the game stores in the memory device 40, which the object hits when falling from the corresponding start position (column 202) to the award position (column 204). For example, the screen 150 of FIG. 5A illustrates one path from the "W" start position 124 to the twenty award 132, wherein the object 106 hits one peg in all seven rows. The screen 160 of FIG. 5B illustrates one path from the "X" start position 124 to the fifty award 138, wherein the object 106 hits one peg in six of the rows and skips one of the rows. The screen 170 illustrates one path from the "Z" start position 124 to the one hundred award 134, wherein the object 106 hits one peg in all seven rows.

The paths comport with the laws of physics and with the game of pachinko. The objects 106 fall vertically downward as if pulled by gravity, so that the object normally only hits one peg per row of pegs. The paths may skip one or more rows, as above, if appropriate. The paths contain angle changes that the laws of physics might predict given a weight and velocity for the object 106. That is, the paths preferably do not contain angle changes that the laws of physics would never predict given any weight and velocity for the object 106.

Varying paths for a given start position 124/award position combination makes the game more exciting for the player. If the game has only one path for each combination, the player is likely to see a pattern for the more likely combinations and be able to anticipate the award position outcome before it occurs. This is not desirable; rather, it is desirable to hold the player in suspense as long as possible. For a given start position, the more likely award positions 128 through 140 have a higher number of different paths. For example, the W-130 and W-132 combinations each have six paths, since both award positions 130 and 132 sit directly below the "W" start position 124. The numbers of paths in the column 208 for the "W" position 124 decrease as the award positions become further and further removed from the award positions 130 and 132.

Likewise, the X-132, X-134 and X-136 combinations have five, six and five paths, respectively, since these positions sit below the "W" start position 124. The numbers of paths in the column 208 for the "X" position 124 decrease as the award positions become further and further removed from the award positions 132, 134 and 136. The path distribution indicated in the column 208 and the different probability distributions indicated in the columns 210 and 212 for the "Y" and "Z" start positions 124 preferably mirror the distributions for the "W" and "X" positions. When the start positions 124 of the start area 122 are the same size and centered above the award positions 128 through 140, which are themselves the same size, the laws of physics would predict a mirroring of the distributions. For example, in FIGS. 4, 5A through 5C and 6, it is as likely that the object 106 falls from the "W" position 124 to the award position 128 as it is that the object 106 falls from the "Z" position 124 to the award position 140.

The probability distribution for selecting award positions indicated in the column 210, for each start position 124, is driven by two factors: (i) the overall value distribution illustrated in the table 190 of FIG. 7 and the number of paths indicated in the column 208. For example, the table 190 sets that the ten value 142 be randomly generated 15% of the time. The award positions 128 and 140 both provide the ten value 142. The probabilities of generating these award positions, for any start position 124 must add up to 15%. For the start position "W," there are four times as many paths leading to the award position 128 as there is leading to the award position 140. Thus, the probability of generating the award position 128 (12%) is four times that for generating the award position 140 (3%) and both add to the required 15%.

For the start position "X," there are three times as many paths leading to the award position 128 as there is leading to the award position 140. Thus, the probability of generating the award position 128 (11.25%) is three times that for generating the award position 140 (3.75%) and both add to the required 15% for the ten value 142. The "Y" probability distribution for the award positions 128 and 140 is the inverse of the "X" distribution. The "Z" probability distribution for the award positions 128 and 140 is the inverse of the "W" distribution.

It should be appreciated that since the award positions 130 and 138 both provide the fifty value 142, the probabilities of generating these award positions, for any start position 124, must add to 30% according to the table 190. Further, since the award positions 132 and 136 both provide the twenty value 142, the probabilities of generating these award positions, for any start position 124, must add to 35% according to the table 190. Only one award position 134 per start position 124 provides the one hundred award, so that each start position 124 maintains a 20% chance of generating the top award.

The distribution scheme of FIGS. 7 and 8 provides a number of benefits to the implementor. First, the game displays the values 142 (e.g., ten, twenty, fifty etc.) in the same award positions 128 through 140 for each attempt in the pachinko-type game. If the game switches the distribution, the player may be misled to think that the positions have been changed to generate a lower value. The game likewise preferably places the top value 142 in the middle award position 134 and makes the remaining values 142 symmetrical about the award position 134 so as not to bias the player's selection of the left versus the right of the start area 122. The game also preferably alternates high and low values 142, similar to the values on a dart board so as not to bias the player's selection of the middle versus the ends of the start area 122.

Second, even though the game follows the outcomes predicted by the laws of physics, each start position 124 has the same expected value. That is, under the distribution scheme illustrated in FIGS. 7 and 8, no start position 124 provides the player an advantage. If a player realizes that a particular start position 124 provides an advantage, the selection process becomes mute and the game less interesting.

Third, each start position 124 has the same total number of paths, i.e., twenty-eight, as indicated in the column 208 of the table 200. In structuring the table 200 in such a way, the game does not become more or less varied or exciting depending upon which start position 124 the player selects. The game pays equal attention to and dedicates an equal amount of computer memory in the device 40 to each start position 124.

Finally, the column 212 provides the probability that the game selects any one of the twenty-eight paths for a selected start area 124. Each probability in the column 212 is between three and four percent. The game does not therefore disproportionately generate any path or group of paths, and the player has roughly an equal chance to see any of the paths on the display device 30 or 32.

In yet another alternative embodiment of the present invention, gaming device 10 is adapted to provide awards 142 in association with the award positions 128 to 140 and to provide intermediate awards in association with the object 106 hitting one or more of the pegs, i.e., intermediate award positions. Referring to FIGS. 4, 5A to 5C and 6, gaming device 10 in one implementation provides an intermediate award in association with a peg selected from: (i) each row of pegs; (ii) every other row of pegs; (iii) one of the middle rows of pegs; (iv) a plurality of middle rows of pegs, etc. Gaming device 10 is adaptable to associate an intermediate award with one or a plurality of pegs from any desired single row or multiple rows of pegs.

The display device 30 or 32 in one embodiment informs the player of which pegs yield an intermediate award. Alternatively, the display device 30 or 32 does not provide such information to the player until the object 106 hits or contacts one of such pegs. When the object 106 contacts a peg that yields an intermediate award, gaming device 10 in one embodiment displays the award next to or adjacent to the peg and thereafter increments the player's award in the paid display 144. Alternatively, a separate award indicator may be provided on the display device 30 or 32 which accumulates any intermediate award with an award 142 from one of the award positions 128 to 140, whereby gaming device 10 then downloads the accumulated award into the paid display 144.

The intermediate awards may operate with the table 200 in a plurality of ways. First, the intermediate awards may be provided independently of the awards 142 generated from the column 206 of the table 200. In such a case, the game mathematics takes into account the fact that the player may generate an award from the table 200 and additionally may generate an intermediate award. Gaming device 10 maintains a probability for obtaining an intermediate award and for obtaining any particular intermediate award. Some intermediate awards may be harder to obtain than others, e.g., higher value intermediate awards.

In another embodiment, when gaming device 10 generates an award 142 from the table 190 of FIG. 7, gaming device 10 thereafter determines if a part of the award 142 comes from or is provided in the form of an intermediate award. For instance, if gaming device 10 generates an award 142 of one hundred for the player, gaming device 10 thereafter determines whether to provide the entire award by picking the award position 134 or to pick another one of the award positions that yields an award less than one hundred. Gaming device 10 would then select a path wherein the object 106 hits one or more of the pegs associated with an intermediate award. The intermediate award(s) would make up for the amount of the player's award that is not provided via the generated award position.

In this latter embodiment, the table 190 may contain an award entry that has a higher value than any of the values associated with the award positions 128 to 140. For instance, the table 190 may be adapted to yield an award 142 of one hundred twenty, wherein the player can still win the highest award associated with any of the award positions (one hundred) as well as one or more intermediate awards. Gaming device 10 may be adapted to make up any difference between the player's overall award and the award provided via the award position by having the object 106 contact one or a plurality of pegs that yield intermediate awards.

Figure 9:
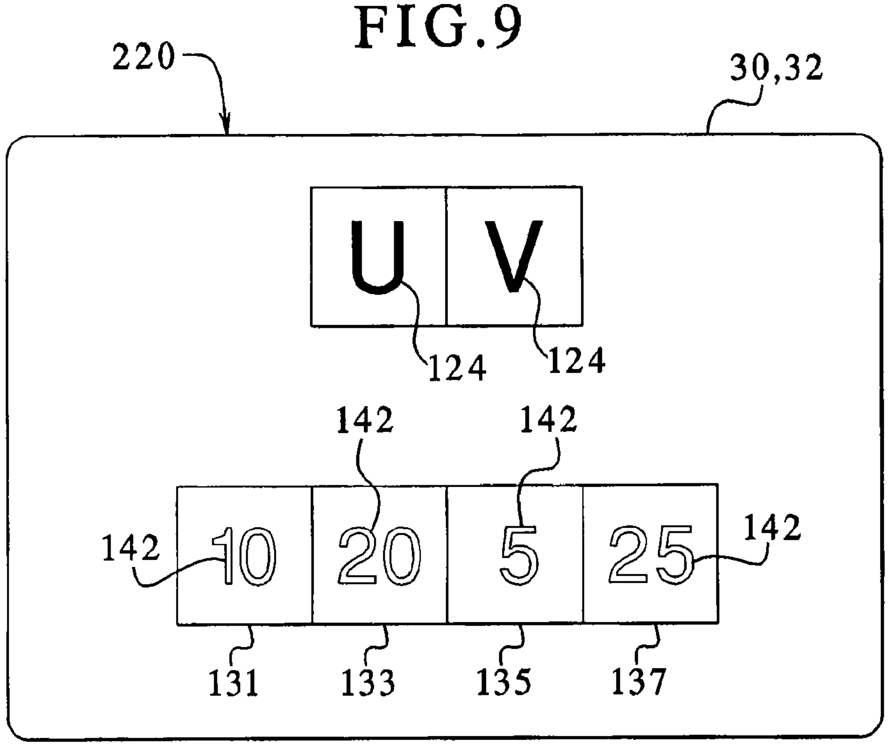
FIG. 9 is a front elevational view of one of the display devices that illustrates one alternative embodiment having a non-mirroring or asymmetrical award value distribution.

Referring now to FIG. 9, an alternative embodiment of the present invention is illustrated by the screen 220 of one of the display devices 30 or 32. The screen 220 illustrates an embodiment, wherein the values 142 do not mirror each other. The values 142 are not symmetrically placed about the center of the "U" and "V" start positions 124. In FIGS. 4, 5A to 5C and 6, the values 142 do mirror each other and are symmetrically placed about the center of the start positions 124. Nevertheless, the mathematics as disclosed in connection with FIGS. 7 and 8 may be adapted for the asymmetrical value distribution as illustrated with respect to FIG. 9.

For example, a table, similar to the table 200, may be stored in the memory device 40 that, for the "U" start position 124, stores: 10 paths for the award position 131; 12 paths for the award position 133; 6 paths for the award position 135; and 2 paths for the award position 137. The object thus has more paths (22) to the closer award positions 131 and 133 than the number of paths (8) to the more remote award positions 135 and 137. The expected value for selecting the "U" start position is the total payout for all the paths divided by the number of paths; or ((10×10)+(20×12)+(5×6)+(25×2))/30; or 14.

The table 200 may also store, for the "V" start position 124: 3 paths for the award position 131; 9 paths for the award position 133; 12 paths for the award position 135; and 6 paths for the award position 137. The object thus has more paths (18) to the closer award positions 135 and 137 than the number of paths (12) to the more remote award positions 131 and 133. The expected value for selecting the "V" start position is again the total payout for all the paths divided by the number of paths; or ((10×3)+(20×9)+(5×12)+(25×6))/30; or 14.

The player therefore receives the same average value 142, regardless of whether the player selects the "U" or "V" start positions 124. The object 106 tends to follow the laws of physics. The value distribution, however, is asymmetrical with respect to the start positions 124, and the values 142 do not mirror each other.

Figure 10:
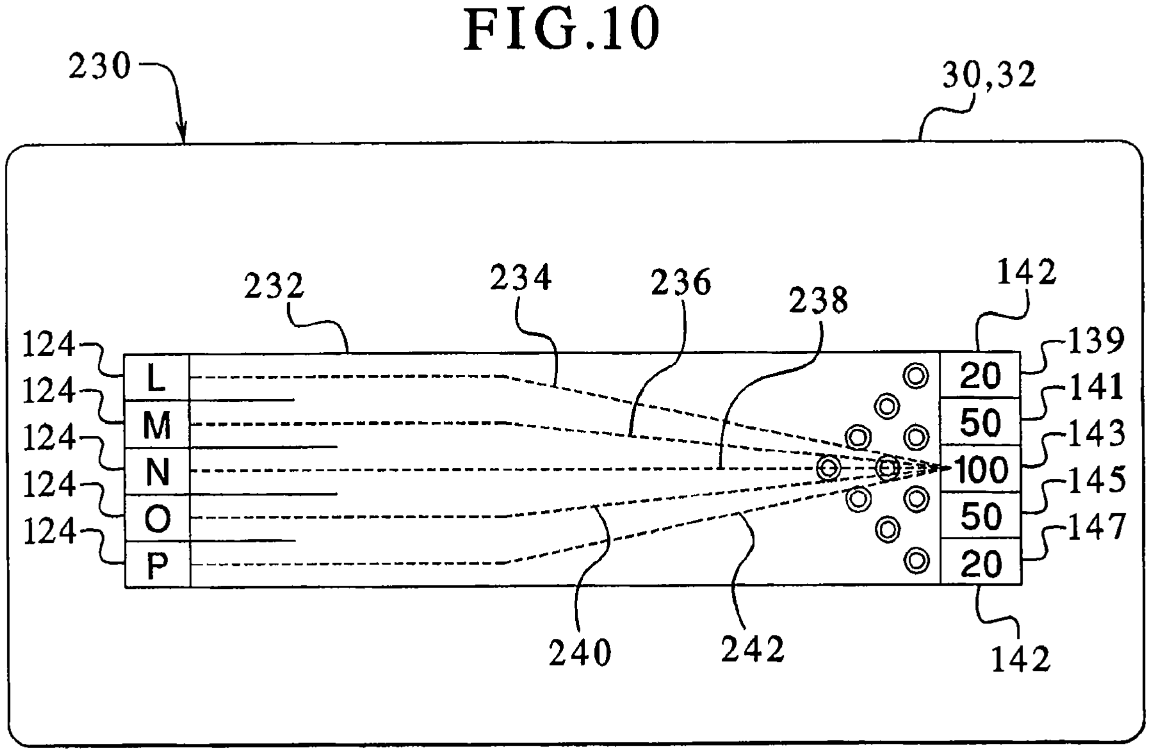
FIG. 10 is a front elevational view of one of the display devices that illustrates one alternative embodiment having a bowling game theme.

Referring now to FIGS. 10 and 11, another embodiment illustrated by the screen 230 of FIG. 10 on one of the display devices 30 or 32 shows a bowling lane 232. The bowling lane 232 includes the "L", "M", "N", "O" and "P" start positions 124 and the award positions 139, 141, 143, 145 and 147. The screen 230 also illustrates one possible path 234 to 242 from each start position 124 to the award position 143. The award position 143 includes the highest award value 142 of one hundred because a bowling ball landing in this position is likely to knock over more bowling pins than if the bowling ball lands in one of the outer award positions.

The bowling embodiment of the screen 230 differs from the pachinko-type embodiments disclosed above because the motion of the ball is not merely dependent on the laws of gravity; rather, a bowling ball path is controlled by characteristics such as gravity, the surface friction of the bowling lane, the speed of the bowling ball and the spin of the ball. Also, the path is to a certain degree chosen by the player. Some bowlers attempt to throw a straight ball while others feel that putting a spin on the ball and attempting a curved path is beneficial. In this embodiment, therefore, the start positions 124 are preferably visible to the player so that the player can throw a straight or a curved ball.

To make a realistic bowling game, the center award position 143 has the highest associated value 142. To give equal opportunity to each of the different player preferences, each start position 124 provides an equal chance of achieving the award position 143. The laws of physics would predict, however, that if a player attempting to put a slight hook on the ball by starting from the "O" start position 124 misses the award position 143, the ball misses more often by landing in the award positions 145 and 147 than by landing in the award positions 139 and 141. A player attempting to put a severe hook on the ball by starting from the "P" start position 124 misses even more often by landing in the award positions 145 and 147.

Referring now to FIG. 11, a table 250 illustrates one possible probability distribution for the bowling embodiment of the screen 230. The data of table 250 is stored in the memory device 40 of the gaming device 10. The table 250 contains the start position column 202 that lists each of the start positions 124 five times, one for each award position 139 to 147 of the award position column 204. For each possible start position/award position combination, the table 250 associates a probability that the game selects the award position (assuming player picks the start position 124) in the column 210.

As illustrated in the table 250, each start position 124 has a forty percent chance of obtaining the award position 143. The "L" and "M" start positions 124 miss the highest value award position 143 more often by landing in the award positions 139 and 141, as would be expected from the bowling lane 232. The "O" and "P" start positions 124 miss the highest value award position 143 more often by landing in the award positions 145 and 147, as would also be expected from the bowling lane 232. The central "N" start position 124 misses equally on either side of the award position 143.

The award values 142 are mirrored or symmetrical as illustrated in the screen 230 of FIG. 10. The probabilities for the award positions 141 and 145 for each of the start positions 124 add to forty percent. The probabilities for the award positions 139 and 147 for each of the start positions 124 add to twenty percent. This ensures the same expected value for the player, regardless of which start position 124 the player selects.

As with the pachinko game of the present invention, the bowling embodiment of FIGS. 10 and 11 may be adapted to allow the player to control one or more physical characteristics of the movement of the ball. For example, gaming device 10 may provide a control device that prompts the player to pick one or more of all of the start position 124, the size or weight of the ball, the speed of the ball, whether the motion of the ball is straight, slightly curved or severely curved. Gaming device 10 then generates an outcome based on the player's input. For example, in one embodiment, the control device enables the player to select a start position 124 but not whether the ball moves straight or hooks.

Based on the player's start position and the generated award position, gaming device 10 generates a path for the ball and the speed of the ball. In another embodiment, the control device enables the player to select a speed and a path (straight or hook) and gaming device 10 generates the start position after generating an award position. In a further embodiment, the control device enables the player to select a start position 124 and a path (straight or hook), wherein the game generates an award position and a speed, i.e., ball hooks less if traveling faster and hooks more if traveling slower to hit the game generated award position based on the player selected start position.

As with the pachinko game of the present invention, the award positions 139 through 147 may alternatively be adapted to be end-positions, which may or may not be associated with an award 142. In one preferred embodiment each of the end-positions is initially associated with an award 142. However, as with real bowling, if the game end-position is generated a second time (i.e., pin is already knocked over) the player receives no award. Each end-position is therefore adapted to yield an award 142 the first time gaming device 10 generates the end-position but not to yield an award 142 upon subsequent generations.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device to:

(a) display a play of at least one game operable upon a wager;

(b) display a start area, the start area including a plurality of different start positions;

(c) display a plurality of different end positions spaced apart from the start area;

(d) display a plurality of award values associated with the plurality of end positions;

(e) display an object moving from a selected one of the start positions to a selected one of the end positions along a selected one of a plurality of different predetermined paths there between, said selected one of the plurality of different predetermined paths selected prior to displaying the object moving, said selected end position based on the selected start position, each start position having a same or a substantially same predetermined average expected award value based on data stored on the at least one memory device; and (f) provide a player with any award value associated with the selected end position.

2. The gaming device of claim 1, wherein when executed by the at least one processor, the plurality of instructions cause the at least one processor to operate with the at least one display device and the at least one input device to display the start positions.

3. The gaming device of claim 2, wherein when executed by the at least one processor, the plurality of instructions cause the at least one processor to operate with the at least one display device and the at least one input device to enable the player to select one of the displayed start positions.

4. The gaming device of claim 1, wherein when executed by the at least one processor, the plurality of instructions cause the at least one processor to operate with the at least one display device and the at least one input device to enable the player to select one of the start positions.

5. The gaming device of claim 1, wherein the selected start position is determined by at least one of: (i) an event displayed by the at least one display device, (ii) a random event, (iii) a game displayed by the at least one display device, and (iv) input from the player.

6. The gaming device of claim 1, wherein one of the award values is associated with each end position.

7. The gaming device of claim 6, wherein the average expected award value for a first start position is based on:

(a) the award value associated with each end position, and (b) the probability of each end position being selected if the first start position is selected.

8. The gaming device of claim 1, which includes at least one selected from the group consisting of:

(i) a plurality of paths from one of the start positions to one of the end positions;

(ii) a plurality of paths from each of a plurality of the start positions to one of the end positions;

(iii) a plurality of paths from each of the start positions to one of the end positions;

(iv) a plurality of paths from one of the start positions to each of a plurality of the end positions;

(v) a plurality of paths from each of a plurality of the start positions to each of a plurality of the end positions;

(vi) a plurality of paths from each of the start positions to each of a plurality of the end positions;

(vii) a plurality of paths from one of the start positions to each of the end positions;

(viii) a plurality of paths from each of a plurality of the start positions to each of the end positions; and (ix) a plurality of paths from each start position to each end position.

9. The gaming device of claim 1, wherein for each of a plurality of the start positions (i) a first one of the end positions is predetermined to be generated more often than a second one of the end positions, and (ii) the first end position is closer in proximity to the selected start position than the second end position.

10. The gaming device of claim 1, wherein when executed by the at least one processor, the plurality of instructions cause the at least one processor to operate with the at least one display device and the at least one input device to randomly determine the selected predetermined path from the selected start position to the selected end position from a plurality of predetermined paths there between.

11. The gaming device of claim 10, which includes a greater quantity of paths from one of the start positions to a first one of the end positions than a quantity of paths from the start position to a second one of the end positions that is further away from the start position than the first end position.

12. The gaming device of claim 10, wherein two of the end positions are associated with the same award value, and wherein a quantity of paths from the selected start position to the end position closer in proximity to the selected start position is greater than a quantity of paths to the end position further in proximity to the selected start position.

13. The gaming device of claim 1, wherein when executed by the at least one processor, the plurality of instructions cause the at least one processor to operate with the at least one display device and the at least one input device to display a plurality of blockages between the start area and the end positions.

14. A gaming device comprising:

at least one display device;

at least one input device;

at least one processor; and at least one memory device which stores a plurality of instructions, which when executed by the at least one processor, cause the at least one processor to operate with the at least one display device and the at least one input device to:

(a) display a play of at least one game operable upon a wager;

(b) display a start area, the start area including a plurality of different start positions;

(c) display a plurality of different end positions spaced apart from the start area, wherein the plurality of end positions are associated with a plurality of award values;

(d) determine one of the end positions based on a selected one of the start positions, wherein for a first start position (i) a first one of said award positions is more likely to be generated than a second one of said award positions, and (ii) said first award position is displayed in closer proximity to the first start position than said second award position, wherein for a second start position (i) the second award position is more likely to be generated than a third one of said award positions, and (ii) said second award position is displayed in closer proximity to the second start position than said third award position, and the first and second start positions having a same or a substantially same predetermined average expected award value based on data stored on the at least one memory device;

(e) display an object moving from the selected start position to the determined end position along a selected one of a plurality of different predetermined paths there between, said selected one of the plurality of different predetermined paths selected prior to displaying the object moving; and (f) provide a player with any award value associated with the selected end position.

15. The gaming device of claim 14, wherein a first award value has a first probability of being generated and a second probability of being generated when the first start position is selected.

16. The gaming device of claim 15, wherein the first probability and the second probability define a total probability of the first award value.

17. A method of operating a gaming device, the method comprising:

(a) causing at least one display device to display a game operable upon a wager;

(b) causing the at least one display device to display a start area, the start area including a plurality of different start positions;

(c) causing the at least one display device to display a plurality of different end positions spaced apart from the start area;

(d) causing the at least one display device to display a plurality of award values associated with the plurality of end positions, (e) causing the at least one display device to display an object moving from a selected one of the start positions to a selected one of the end positions along a selected one of a plurality of different predetermined paths there between, said selected one of the plurality of different predetermined paths selected prior to causing the at least one display device to display the object moving, said selected end position based on the selected start position, each start position having a same or a substantially same predetermined average expected award value based on data stored on at least one memory device, and (f) providing a player with any award value associated with the selected end position.

18. The method of claim 17, which includes causing the at least one display device to display the start positions.

19. The method of claim 18, which includes enabling the player to select one of the displayed start positions.

20. The method of claim 17, which includes enabling the player to select one of the start positions.

21. The method of claim 17, which includes determining the selected start position by at least one of: (i) an event displayed by the at least one display device, (ii) a random event, (iii) a game displayed by the at least one display device, and (iv) input from the player.

22. The method of claim 17, which includes associating one of the award values with each end position.

23. The method of claim 22, wherein the average expected value for a first start position is based on:

(i) the award value associated with each end position, and (ii) the probability of each end position being selected if the first start position is selected.

24. The method of claim 17, which includes selecting said predetermined path from at least one selected from the group consisting of:

(i) a plurality of paths from one of the start positions to one of the end positions;

(ii) a plurality of paths from each of a plurality of the start positions to one of the end positions;

(iii) a plurality of paths from each of the start positions to one of the end positions;

(iv) a plurality of paths from one of the start positions to each of a plurality of the end positions;

(v) a plurality of paths from each of a plurality of the start positions to each of a plurality of the end positions;

(vi) a plurality of paths from each of the start positions to each of a plurality of the end positions;

(vii) a plurality of paths from one of the start positions to each of the end positions;

(viii) a plurality of paths from each of a plurality of the start positions to each of the end positions; and (ix) a plurality of paths from each start position to each end position.

25. The method of claim 17, wherein for each of a plurality of the start positions (i) predetermining a first one of the end positions to be generated more often than a second one of the end positions, and (ii) causing the at least one display device to display the first end position in closer proximity to the selected start position than the second end position.

26. The method of claim 17, which includes randomly determining the selected predetermined path from the selected start position to the selected end position from a plurality of predetermined paths there between.

27. The method of claim 26, which includes associating a greater quantity of paths from one of the start positions to a first one of the end positions than a quantity of paths from the start position to a second one of the end positions that is further away from the start position than the first end position.

28. The method of claim 26, which includes associating two of the end positions with the same award value, and wherein a quantity of paths from the selected start position to the end position closer in proximity to the selected start position is greater than a quantity of paths to the end position further in proximity to the selected start position.

29. The method of claim 17, which includes causing the at least one display device to display a plurality of blockages between the start area and the end positions.

30. The method of claim 17, which is provided through a data network.

31. The method of claim 30, wherein the data network is an internet.

32. A method of operating a gaming device, the method comprising:

(a) causing at least one display device to display a game operable upon a wager;

(b) causing the at least one display device to display a start area, the start area including a plurality of different start positions;

(c) causing the at least one display device to display a plurality of different end positions spaced apart from the start area, wherein the plurality of end positions are associated with a plurality of award values;

(d) determining one of the end positions based on a selected one of the start positions, wherein for a first start position (i) a first one of said award positions is more likely to be generated than a second one of said award positions, and (ii) said first award position is displayed in closer proximity to the first start position than said second award position, wherein for a second start position (i) the second award position is more likely to be generated than a third one of said award positions, and (ii) said second award position is displayed in closer proximity to the second start position than said third award position, and the first and second start positions having a same or a substantially same predetermined average expected award value based on data stored on at least one memory device;

(e) causing the at least one display device to display an object moving from the selected start position to the determined end position along a selected one of a plurality of different predetermined paths there between, said selected one of a plurality of different predetermined paths selected prior to causing the at least one display device to display an object moving; and (f) providing a player with any award value associated with the selected end position.

33. The method of claim 32, wherein a first award value has a first probability of being generated and a second probability of being generated when the first start position is selected.

34. The method of claim 33, wherein the first probability and the second probability define a total probability of the first award value.

35. The method of claim 32, which is provided through a data network.

36. The method of claim 35, wherein the data network is an internet.

* * * * *